(12) United States Patent
Suganuma

(10) Patent No.: US 7,709,721 B2
(45) Date of Patent: May 4, 2010

(54) MUSIC AND MATH TEACHING SYSTEM

(76) Inventor: Alan K. Suganuma, 10459 Rosemount Dr., Tampa, FL (US) 33624-5114

( * ) Notice: Subject to any disclaimer, the term of this patent is extended or adjusted under 35 U.S.C. 154(b) by 210 days.

(21) Appl. No.: 11/987,677

(22) Filed: Dec. 3, 2007

(65) Prior Publication Data

US 2009/0142738 A1   Jun. 4, 2009

(51) Int. Cl.
*G09B 15/02* (2006.01)
(52) U.S. Cl. .......................... 84/476; 434/178
(58) Field of Classification Search ............ 84/476, 84/470 R–471 SR; 434/178
See application file for complete search history.

(56) References Cited

U.S. PATENT DOCUMENTS

| 4,711,563 A | * | 12/1987 | Lass .............................. 355/21 |
| 6,967,274 B2 |   | 11/2005 | Hanington |
| 2003/0207239 A1 | * | 11/2003 | Langlois ..................... 434/178 |

\* cited by examiner

*Primary Examiner*—Jianchun Qin
(74) *Attorney, Agent, or Firm*—William M. Hobby, III

(57) ABSTRACT

A music and math teaching system teaches fraction computations utilizing musical note names and note values in the form of blocks with varying lengths while simultaneously teaching rhythmic topics of time signatures, beats, and tempo. A rhythm board is used to mount note blocks and beat blocks in the process and a blind is used to block the vision of a student working with the blocks.

5 Claims, 10 Drawing Sheets

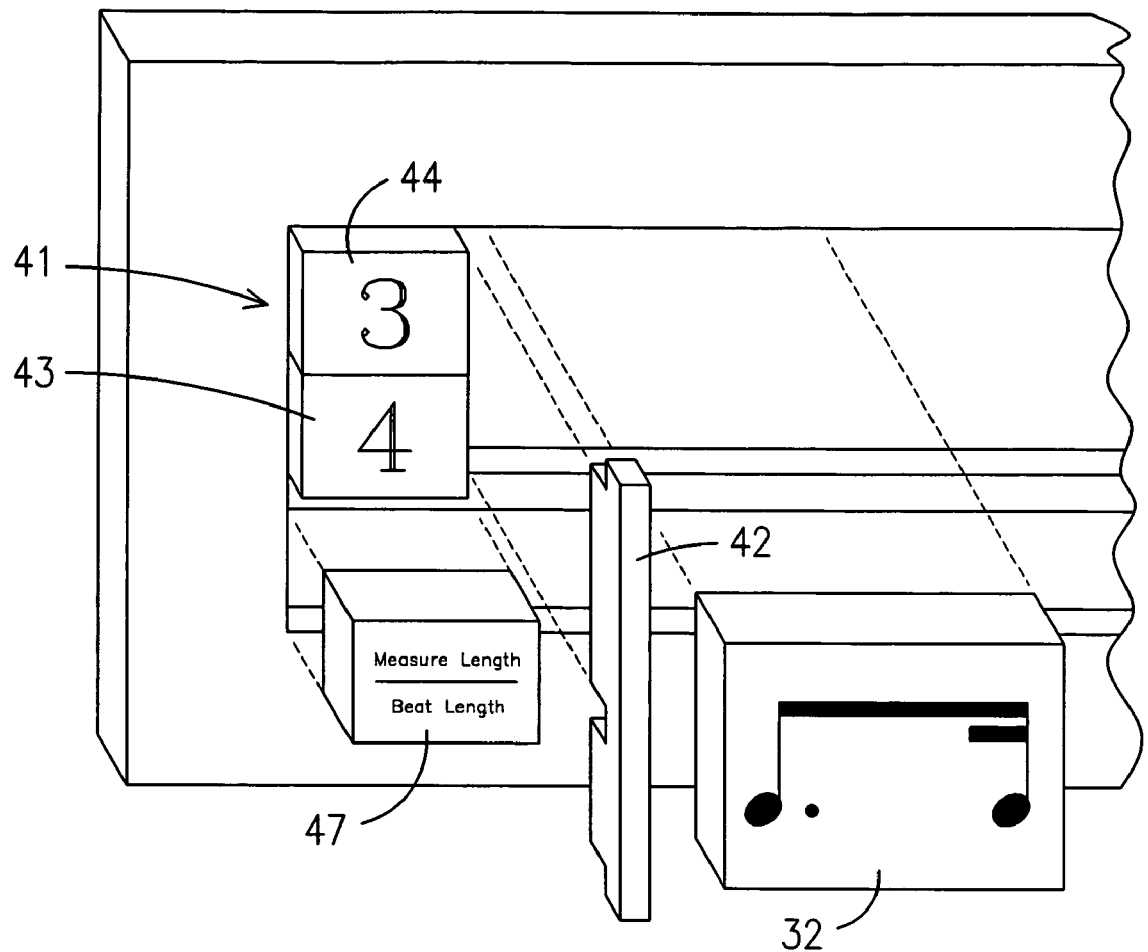
*FIG. 5*
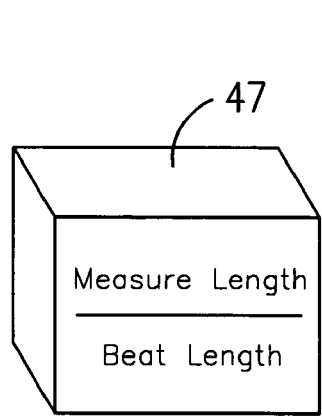 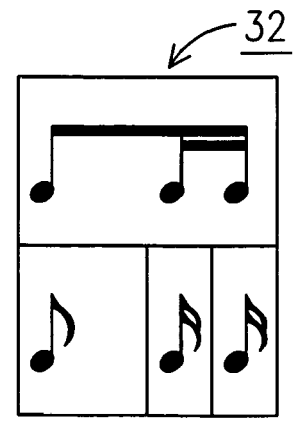
*FIG. 6*        *FIG. 7*

MUSIC AND MATH TEACHING SYSTEM

BACKGROUND OF THE INVENTION

1. Field of the Invention

The present invention relates generally to a system of teaching fraction computations utilizing musical note names and note values in the form of blocks with varying lengths; while simultaneously preparing a student to learn additional rhythmic topics: time signatures, beats, tempo, and rhythmic performance.

2. Description of Related Art

A new music student has to master several mental concepts and physical coordination in order to successfully play music. Mastering the physical coordination is generally the repetition of practice to gain muscle memory; whereas learning the mental concepts requires an understanding gained through one or more experiences: Spatial, Visual, Auditory, or Tactile. Reading music requires an understanding of several concepts including note values, beats, time signatures, and rhythm. There are fundamental mathematical principals necessary for a student to grasp when learning music; such as musical note values with fraction names, beats used for counting to indicate measurement, time signatures providing ratios to the relationship of notes to beats and measure to beats.

The fraction note names (Half note, Quarter note, Eighth note, Sixteenth note, etc,) come from the division of the whole note. Each kind of note represents a value; traditionally taught as an amount of time sustained as beats. Beats, in terms of counting, are known as a relative value of time that is used to measure how long a note is sustained. Time Signatures usually comprised of two numbers, one number placed over another number. Traditional methods teach, the top number indicates the number of beats per a measure of music, and the bottom number indicates which note equals one beat. For example in the time signature ¾, the top number 3 indicates that there are 3 beats per measure, and the bottom number 4 indicates that the Quarter note equals one beat. The 4 as the bottom number in the time signature is representative of the 4 in the bottom number of the fraction ¼, the numerical form of the quarter note. Therefore, the value of a musical measure will be equal to the value of 3 quarter notes. More specifically, the amount of time a measure of music in ¾ is the total time it takes for 3 quarter notes to be sustained for a period of time, measured by a determined amount of time of 3 beats. The inter-related complexity of note values, beats, and time signatures and the conditions that govern each other, lend to the need to simultaneously teach these music concepts.

Traditionally, the instruction of fraction computations and music concepts are taught independently to children aged six (6) years or older. The reason for traditionally teaching children at this age is due, in a large part, to the difficulty of teaching these abstract concepts using conventional methods. Fractions are commonly introduced as numerical representations in the form of two-dimensional shading. Children are instructed to solve problems using a set of operations and rules based on memorization. For example, to solve ⅛+ 1/16, both denominators must be the same number. Step one: the least common denominator must be found (the number 16 in this case). Step 2: The 8 in the denominator needs to be changed to the number 16, without changing the value of the ⅛. Step 3: the numerator and the denominator of ⅛ are both multiplied by the number 2. Step 4: the new equation is 2/16+ 1/16. Step 5: add only the numerators to arrive at the answer 3/16.

There are several disadvantages to the prior arts traditional teaching methods that are addressed by the present invention. The present invention, as it pertains to fraction computations, teaches ages as young as pre-kindergarten the introducing of the concepts of fraction addition, "least Common denominator", and the division of fractions. As it pertains to musical rhythm, the present invention removes teaching abstract values of time and simultaneous instruction; while providing concrete concepts by teaching spatial lengths with 3 dimensional manipulatives using a method that teaches one subject at a time. Features and methods utilized in this invention described herein provide for teaching young students fraction computations and music concepts where other forms of instruction do not.

The Hanington invention U.S. Pat. No. 6,967,274 claims to teach the correct rhythm through the use of varying thickness relationship of notes in a musical measure and the time signature. Although this is a highly effective method of correct amount of note/rest values per musical measure for a specified time signature, conversely, it fails application when teaching students a specific time signature for a specified amount of note/rest values for a single musical measure. Based on the Hanington's patent claims and description, notes of a certain thickness added together equals the thickness of a time signature. For example, a ¾ time signature thickness is equal to the total thickness of 3 one-quarter note values. Similarly, given the total thickness of 3 one-quarter note values, it would equal the thickness of ¾ time signature. However in this example, a student given a 3 one-quarter note value thickness cannot specifically determine the whether the time signature is ¾, 6/8, 12/16, etc., because in the Hanington invention, 4 and the 6/8 time signature are the same thickness. However, 1 in these varied time signatures the notes have different rhythmical counts (beats).

The Hanington invention has beat mats to indicated the number of beats used for a specific time signature; once again, it fails application when teaching students the specific kind of note equal to 1 beat. For example, a ¾ time signature would indicate the use of 3 beat mats for a single musical measure; conversely, a student given 3 beat mats cannot determine a specific time signature, the top number of the time signature would be 3, but the bottom number remains unknown. Moreover it fails to indicate the beat division of the ½ beat and ¼ beat that would indicate the exact note/rest placement within the musical measure. In short, the Hanington invention includes no true teaching correlation between beats, notes and the time signature. The features and advantages of the present invention will be set forth in the description which follows.

SUMMARY OF THE INVENTION

Mathematical Instruction

The present invention comprises a system and method of teaching children mathematical concepts and fundamental computations utilizing musical notes, employing a method of sensory experiences by means of the visual, auditorial, spatial, and tactile learning methods. A blind is a part of the invention that emphasizes student learning by; spatial identification as well as tactile means. Students are taught musical note names and corresponding musical images to learn the numerical fractions and their computations. Numerical fractions are exchanged for the equal value of musical note blocks to form equations and fraction equalities. For example, to teach ⅛+ 1/16 the student perform a series of steps. Step 1: the student replaces the ⅛ for the musical spatial note block with the image of an eighth note, and 1/16 for the musical spatial note block with the image of a sixteenth note. Step 2: The student makes all images the same kind of note by exchanging the eighth note block for the spatial equivalent of 2 sixteenth note blocks to form a new note equation. The new spatial note block equation is 2 sixteenth notes+1 sixteenth note. Step 3: The student simply counts the number of notes and describes the kind of notes, 3 sixteenth notes. Step 4: The student then writes the numerical fraction 3/16 as the answer. In this invention, Note and Fraction blocks teach and introduce the fundamentals of mathematical fractions including fraction equalities, fraction addition & division, and improper to proper fraction reduction (i.e. 3/2=1½). Students gain the understanding of the rules of fractions through the physical experiences of spatial, auditory, visual, and tactile. The added emphasis on spatial and tactile experiences allow the fundamentals of mathematical fractions to form the basis of advanced mathematical learning starting at pre-kindergarten ages.

Music Instruction:

While math is the basic foundation of musical rhythm, in music the addition of the musical concepts, such as beats and time signatures, become added factors. In mathematics ¾ equals 6/8 in value, but in the world of music this is not true. In this invention, time is the speed (Tempo) through which we experience the spatial length of a measure of music. It is the concepts of time signature redefined in this invention as a measure signature, that differentiates this invention from all other traditional music methodology. The present invention teaches a system that separates note values, beats, and time signatures into independent subjects. Notes are musical symbols representing objects of spatial lengths. Beats are units of spatial measurements, similar to that of feet, yards, and miles. A measure of music is the spatial distance from one bar line to the next bar line. Bar lines are the boundary lines that define the length of a measure of music. In the measure signature, the top number represents the measure spatial length, the bottom number represents the beat spatial length. The present invention uses the beat blocks as the foundation for which notes and measures of music are spatially measured. Students describe the measurement of the spatial length of any note in terms of any kind of beat block. Additionally, students measure the spatial length of a musical measure when given a specific measure signature. For example in a measure signature of ¾, the 4 in the bottom indicates the beat block spatial length to be the spatial length of a quarter note block. The top number 3, in the measure signature indicates that the spatial length of a musical measure is the total of 3 quarter-note-beat block lengths.

BRIEF DESCRIPTION OF THE DRAWINGS

Other objects, features and advantages of the present invention can be understood from the written description and the drawings in which:

FIG. 5 is a partial exploded view of a set up for the learning board;

FIG. 6 is perspective view of a measure signature instruction block;

FIG. 7 is a plan view of note blocks;

DETAILED DESCRIPTION OF THE EMBODIMENTS

Figure 1:
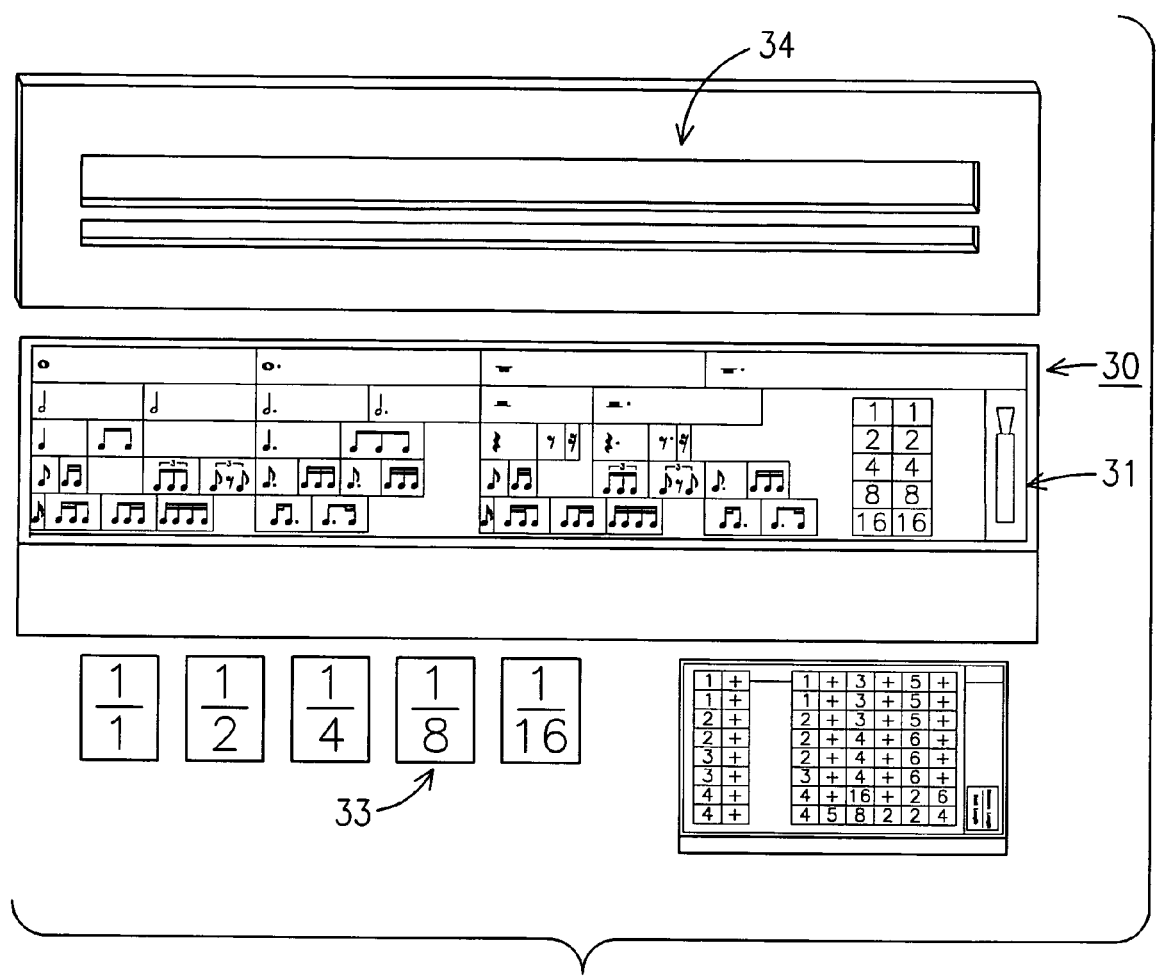
FIG. 1 is a perspective view of music and math learning kit in accordance with the present invention.
Figure 2:
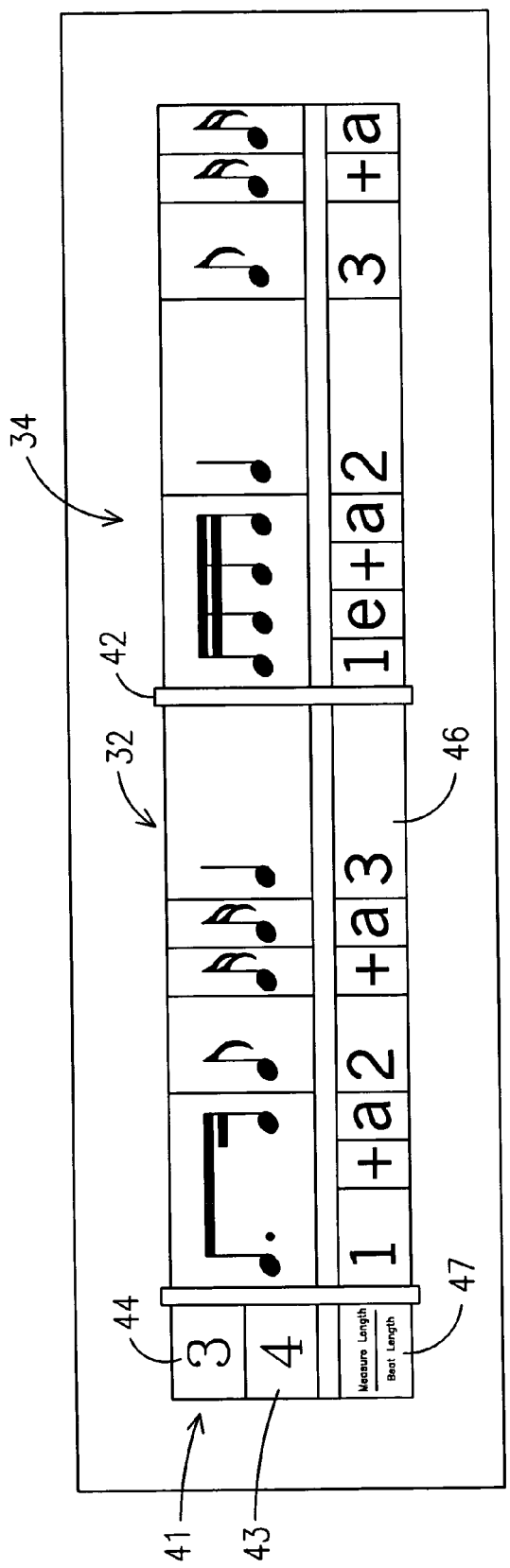
FIG. 2 is a plan view of a teaching set up of the learning board of FIG. 1.
Figure 8:
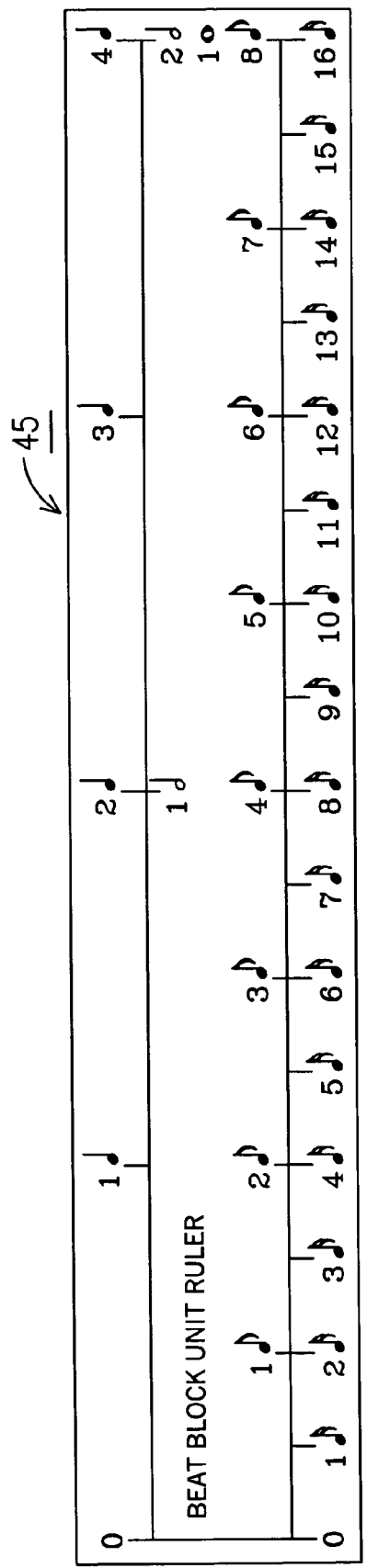
FIG. 8 is a plan view of beat block ruler.
Figure 9:
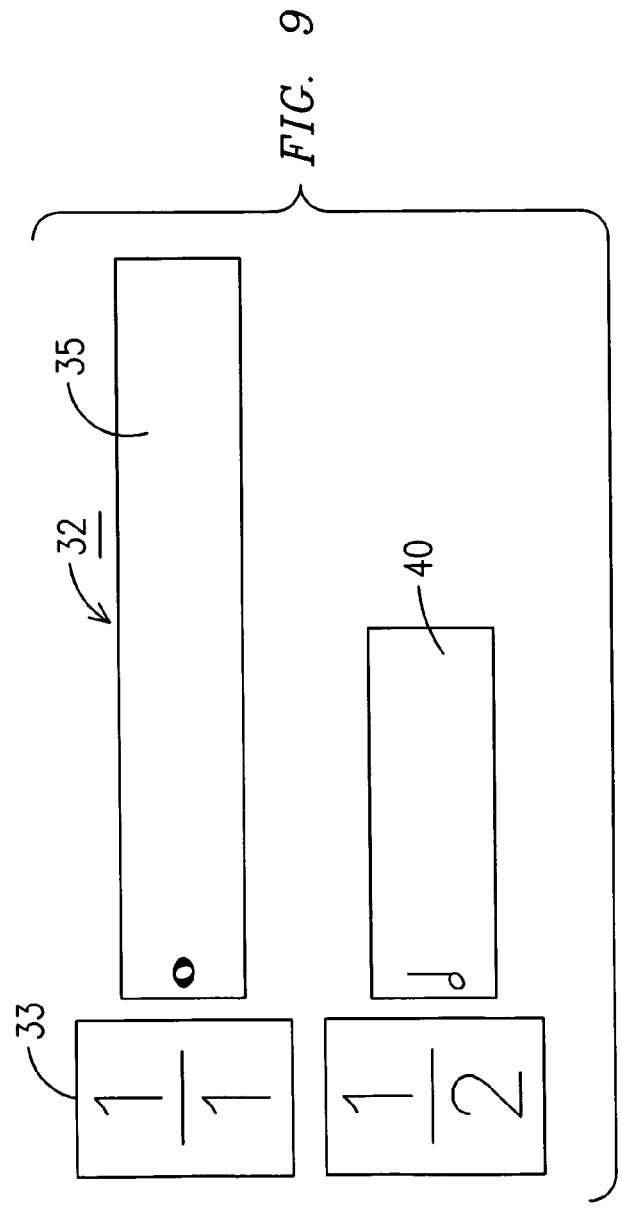
FIG. 9 is plan view of two note blocks and equivalent fraction cards.
Figure 10:
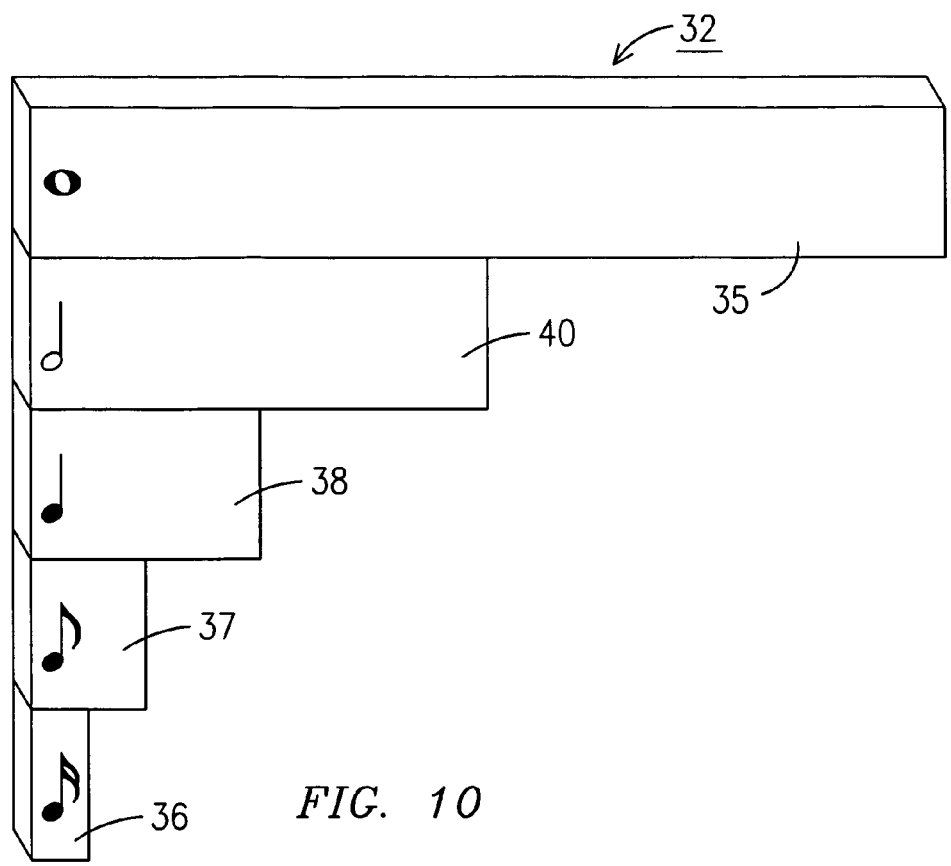
FIG. 10 is a perspective view of note blocks.
Figure 11:
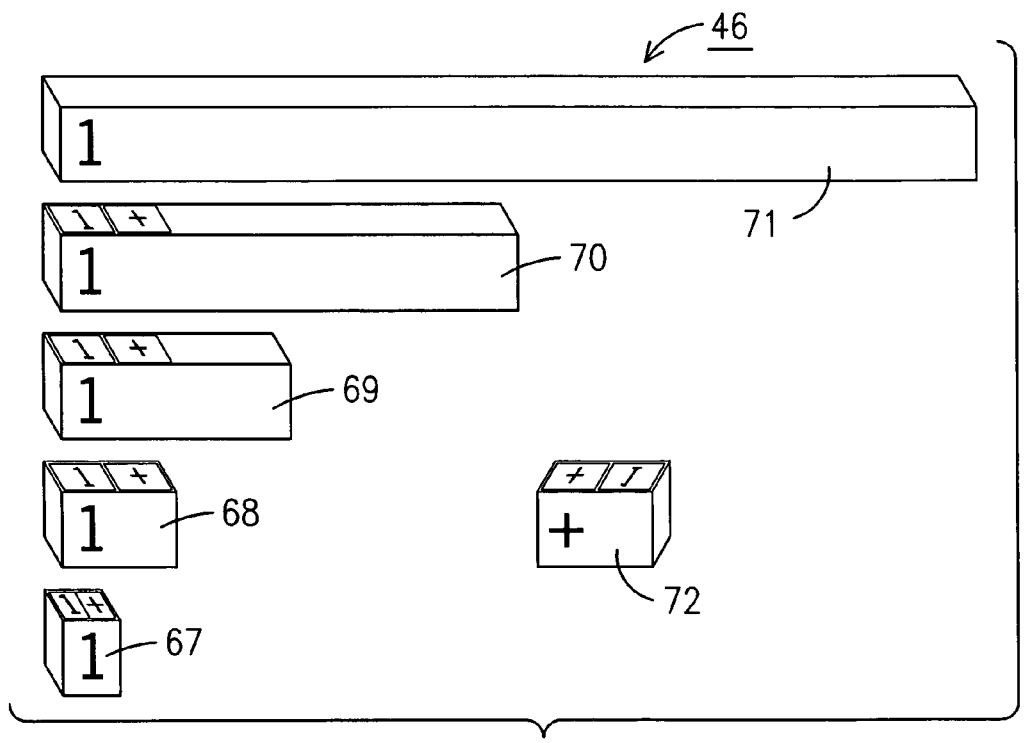
FIG. 11 is a perspective view of beat blocks.

Referring to drawing, FIGS. 1 through 17, and especially to FIGS. 1 and 2, of the drawings, a math and music teaching system kit 30 is illustrated having a storage box 31 holding a plurality of note blocks 32 and fraction blocks 39 of different lengths and a plurality of fraction cards 33. The kit 30 also includes a learning board 34 for mounting teaching arrangements of note blocks 32, beat blocks 46 and time signature 41. FIGS. 1 through 17 illustrates the different learning blocks and arrangements. Fraction note Blocks 39 are proportioned from a determined whole block 35 length divided into fractions note blocks 36 (1/16), 37 (1/8), 38 (1/4), 40 (1/2) as seen in FIG. 10 and also 2/16, 3/16, 4/16, 2/8, 3/8, 4/8. Each fraction block 39 is double sided. One side has a musical note image and the other side has the numerical fraction equivalent value. The grouped note images on note blocks 32 are spaced proportionate to the spatial length of the individual notes, as seen in FIG. 7. Fraction cards 33 include 1/16, 1/8, 1/4, 1/2, 1/1 with the set of fraction blocks 39 and note blocks 32 for note and numerical identification. The note blocks 32 are proportioned from the determined whole note block 35 length divided into a variety, but not limited to, different note combinations. Each note block 32 is double sided with corresponding rests 50 or equal note value grouped notes. The grouped note heads, the round part of the note images, are spaced proportionate to the spatial length of the individual notes, as seen in FIGS. 2 and 7, Measure Signature Blocks 41 includes the various top or numerator 44 and bottom or denominator 43 which form the measure signatures. A measure signature Bar line 42 is used to mark off measures in the rhythm board 34. The present invention teaches up to 24 different measure signatures and may include more, but is not limited to 24 because there are an infinite number of possibilities for top and bottom numbers. There is a set of double-sided bottom number (denominator) blocks 43 (1,2,4,8,16). For every denominator block 43 there is a corresponding musical note image on the reverse side of the block: whole note, half note, quarter note, eighth note, sixteenth note—respectively. A second set of measure signature blocks are the numerators blocks 44. These numbers can be any number from one upwards. In the measure signature, the bottom number 43 represents the 'length of the beat' block, and the top number represents the 'length of the measure' 44. The invention redefines the measure of music's spatial length parameters as 'measure signature'; as time signatures are time descriptions, the measure signatures are length descriptions. A measure signature descriptor block 47 may also be used as seen in FIGS. 1, 5 and 6 and illustrates measure length is over beat length. The Beat Block Unit Ruler 45 of FIG. 8 is a measuring device to quickly and easily measure the spatial lengths of notes and measures of music. The ruler 45 has marker points every sixteenth beat block units. The marker points have musical note images to indicate the beat unit description. Beat Blocks 46 are of a dimension less tall than the note blocks. There are 5 lengths of beat blocks. For each note block, whole to the sixteenth note, there is a beat block length as seen in FIG. 11. The beat blocks 46 are units of a unique spatial measurement system of length. The sixteenth beat block unit is the smallest length within the invention. The sixteenth beat block unit is the same length of the sixteenth note block. For example, 2 sixteenth beat block units (b.b.u.) measures the spatial length of 1 eighth note. Note blocks 32 are measured using any of the different beat block units. For example, the Half note block spatial measurement can be described in 4 different ways: 8 sixteenth b.b.u.; 4 eighth b.b.u.; 2 quarter b.b.u.; 1 half b.b.u. The Beat Block Unit System is likened to the English measuring system of inches, feet, and yards. For example, a table's length measurement can be described in 3 different ways: 36 inches; 3 feet; or 1 yard. Beat blocks also measure the spatial length of a musical measure and indicate note position within the musical measure. Beat Blocks 46 are double sided with Arabic numerals and standard music counting symbols: +, e, a, trip-, let, as seen in FIG. 2 and FIG. 11. These symbols represent the length of a ½ beat, ¼ beat, and ⅓ beat divisions, for the purpose of the exact note position within a full beat. For example, in a ¾ measure signature, a full beat block length is the quarter b.b.u. 69 (the length of a ¼ note block 38); the ½ beat block length is the length of an eighth b.b.u. 68; the ¼ beat block length is the length of a sixteenth b.b.u. 67. FIG. 2 illustrates the '+' symbol for the ½ beat positions and the 'a' & 'e' symbols for the ¼ beat positions.

As illustrated in FIG. 2, the rhythm board 34 measure signature 41 has 4 as the denominator 43, that indicates the beat block length as the ¼ beat block unit 69. The 3 as the numerator 44 in the measure signature 41 indicates that each measure of music length is the total length of three ¼ beat block units 69. The measure marking blocks 41 in place with the note blocks 32 in the top and the beat blocks 46 in the bottom of the rhythm board. Beat units divide into smaller fraction block lengths to indicate the exact note location within the measure. For example, in FIG. 2, each beat can be segmented into 4 sixteenth beat block units. In the first measure, the notes occupying the $2^{nd}$ beat block unit position are an eighth note 37 plus 2 sixteenth notes 36. The '2' beat block below the eighth note is half the length of a full ¼ beat block unit 69. The '+' sign below the first sixteenth note indicates the start of the second half of the '2' beat position. The 'a' sign below the second sixteenth note of beat $2^{nd}$ beat indicates the last position of the beat. In the second measure, of FIG. 2, the $1^{st}$ beat unit is divided into 4 smaller fraction block lengths to indicate the ¹⁄₁₆ note location within the $1^{st}$ beat unit. The '1' sign below the first sixteenth note indicates the first ¼ beat position; the 'e' sign indicates the second ¼ beat position; the '+' sign indicates the third ¼ beat position; and the 'a' sign indicates the fourth ¼ beat position. The Rhythm Board 34 is not to be limited to the specific design herein, to hold the measure signature blocks 41 and note blocks 32 in the top depression, and the beat blocks 46 in the lower depression as shown in FIGS. 2 and 5. Bar Lines are used to define the spatial length of measure of music. The bar lines are engineered, but not limited, to fit onto a rail on the rhythm board as seen in FIG. 5.

Figure 4:
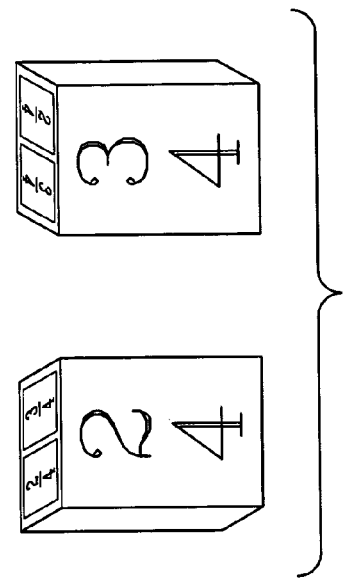
FIG. 4 is a perspective view of measure signature blocks of the present invention.
Figure 3:
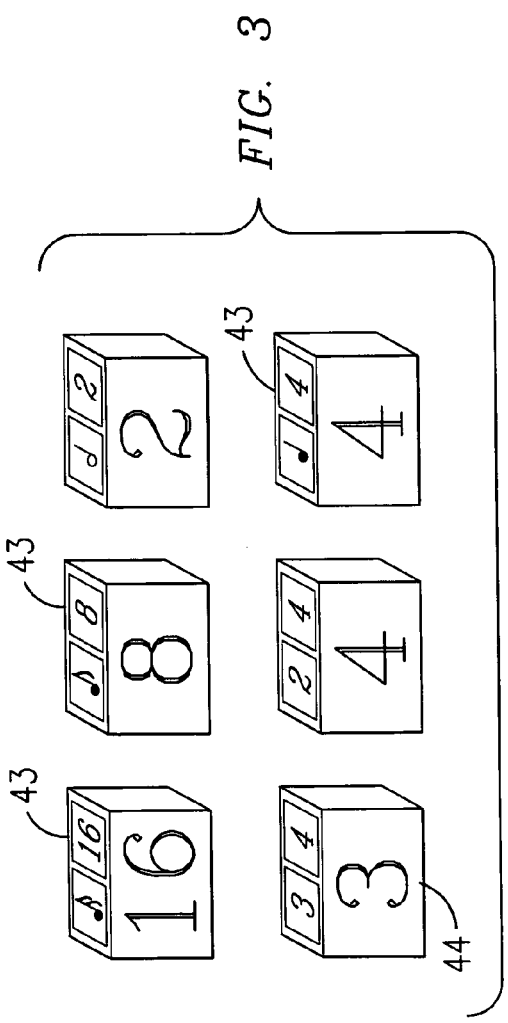
FIG. 3 is a perspective view of individual numerator and denominator measure signature blocks for the present invention.
Figure 12:
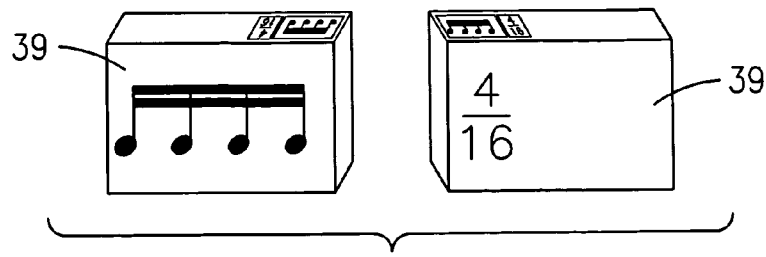
FIG. 12 is a perspective view of a fraction block.
Figure 13:
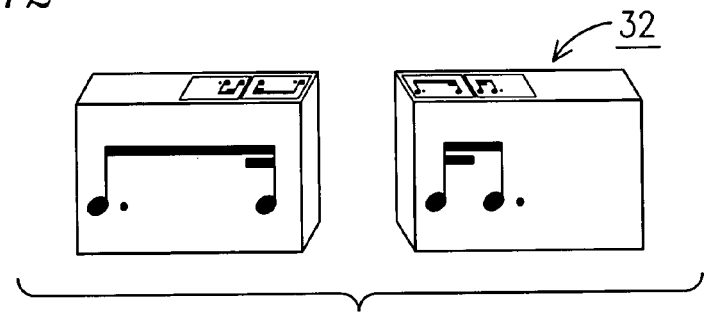
FIG. 13 is a perspective view of a note block with inverse rhythms.
Figure 14:
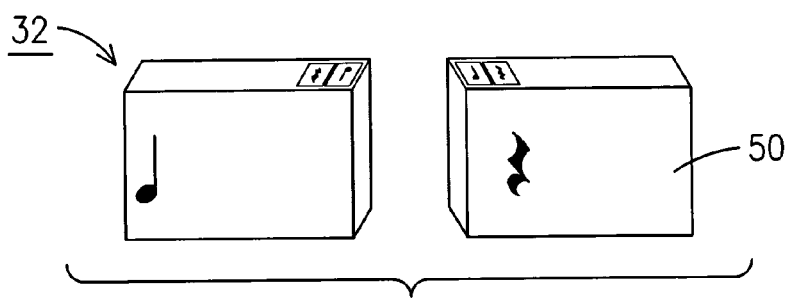
FIG. 14 is a perspective view of a note and a rest block.
Figure 15:
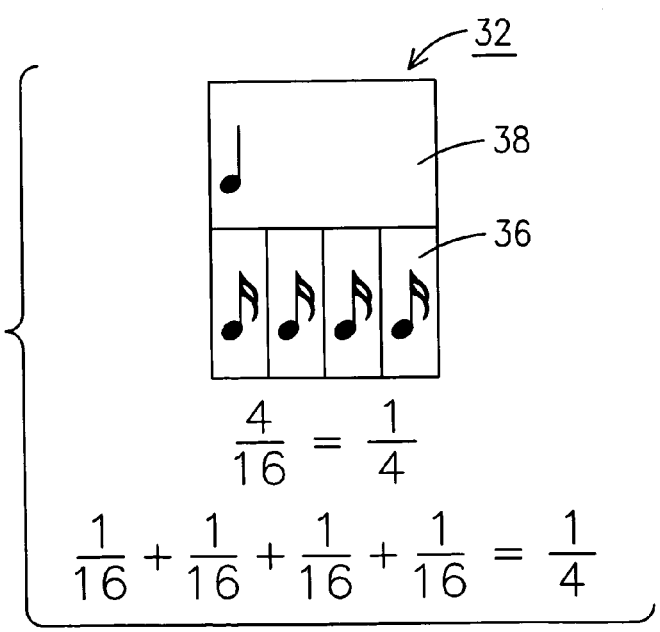
FIG. 15 is a plan view of notes blocks and equivalent fractions.
Figure 16:
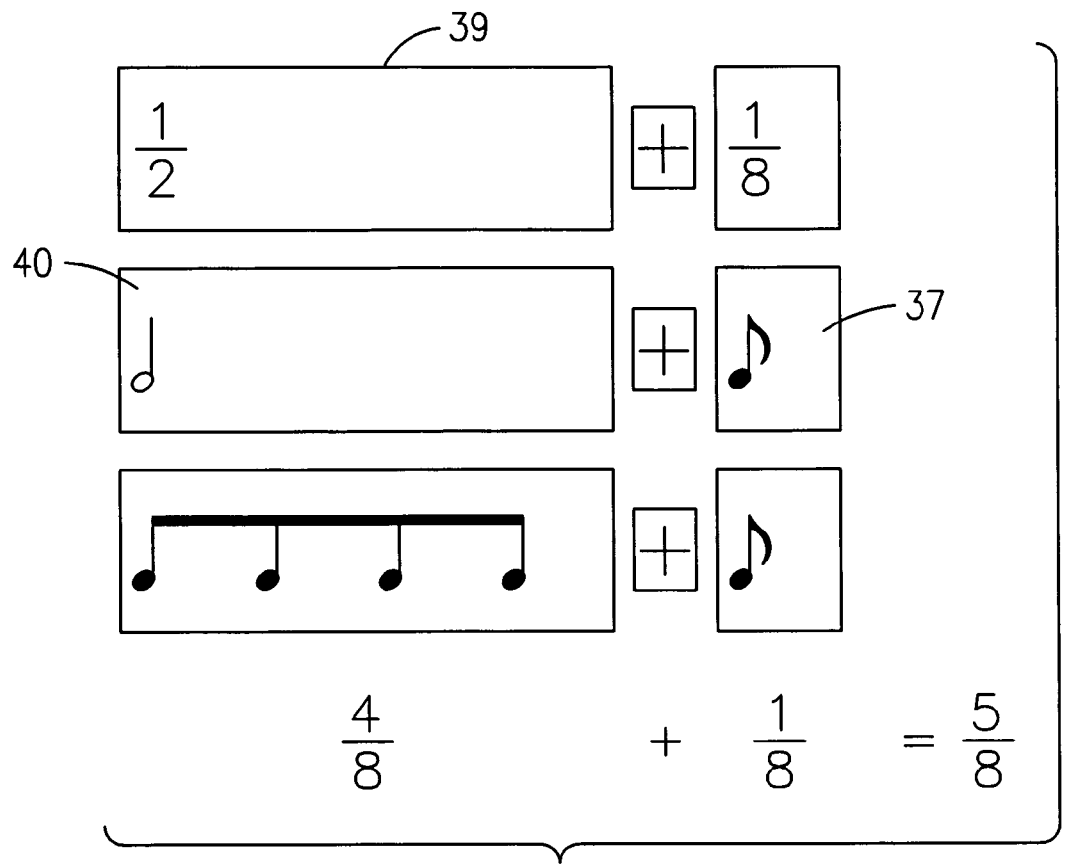
FIG. 16 is a plan view of adding note block fractions.
Figure 17:
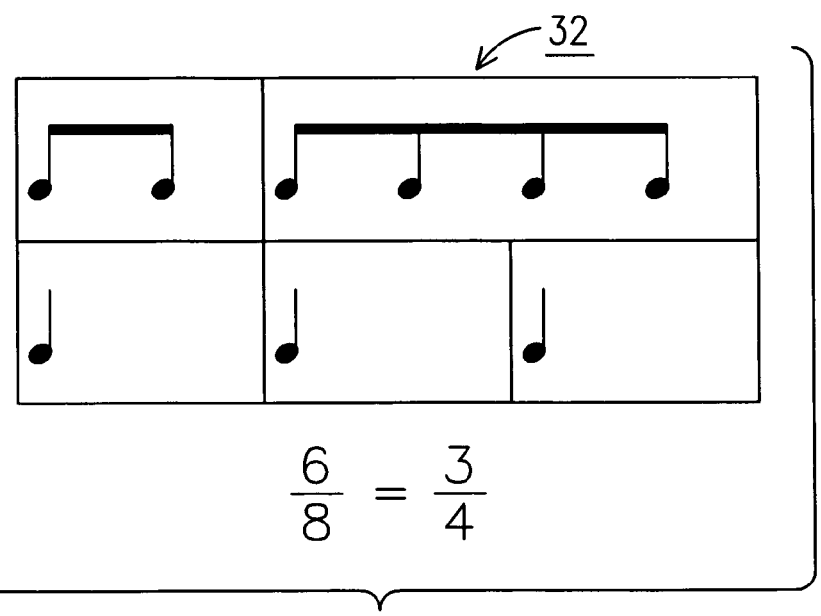
FIG. 17 is a plan view of another view of note blocks and equivalent fractions.
Figure 18:
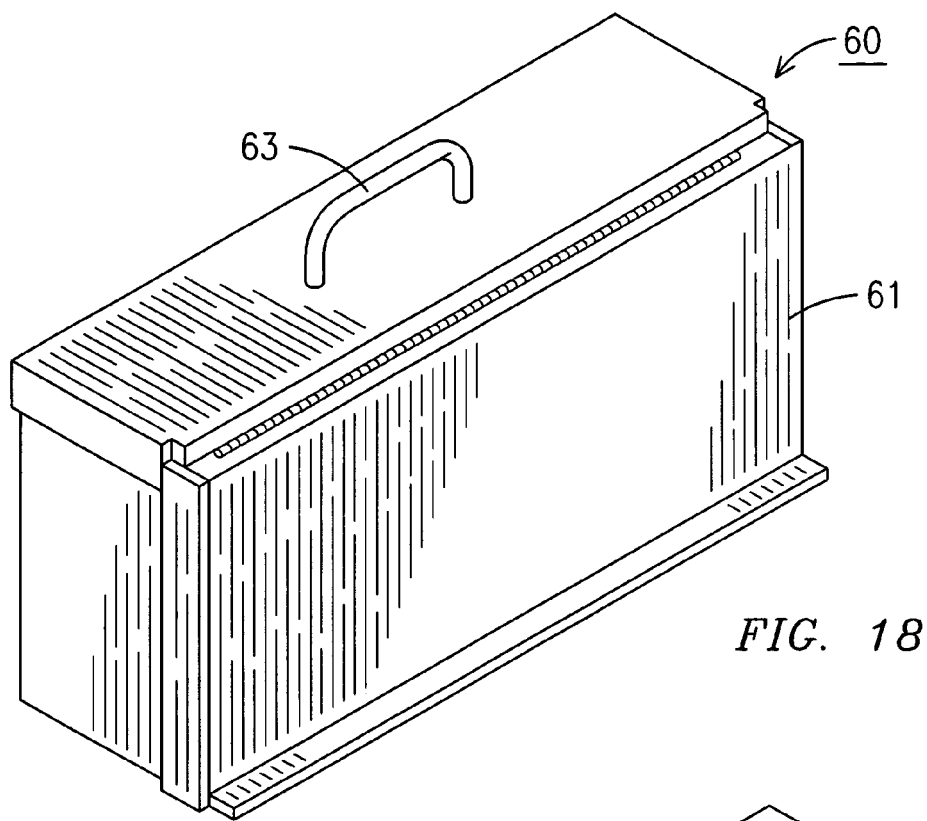
FIG. 18 is perspective view of a blind learning box for use with the learning block kit of FIGS. 1 through 17.

FIG. 3 shows measure signature denominator blocks 43 having the number 16 on one side and a one sixteenth note thereon and a block with the number 8 with a one eighth note thereon while FIG. 4 shows common numerator and denominator measure signature block combinations. FIG. 6 is the measure signature description block 47 indicating that measure length is placed over beat length. FIG. 7 illustrates note blocks 32 with proportionately spaced an eighth note and 2 sixteenth note blocks. FIG. 9 has a fraction card 33 for a whole note placed next to a whole note block 35 and a fraction card for a half note 40 to allow the teaching of fractions relative to length of note blocks. FIG. 10 illustrates note blocks 32 of different lengths while FIG. 11 has beat blocks of different lengths. FIG. 12 has four sixteenth fraction block side adjacent a block with 4 one sixteenth notes thereon each block having the same length. FIG. 14 has a quarter rest block placed next to a quarter note block of the same length. FIG. 15 illustrates the use of a quarter note block 38 adjacent 4 one sixteenth note blocks 36 and illustrates that 4 sixteenths is equal to one fourth. FIG. 16a one half fraction block 39 and a one eighth block being equal in length to either a half note block 40 and a one eighth note block 37 or to 4 one eighth note blocks plus a one eighth note block. FIG. 17 six eighths is equal to three quarters in note length. These illustrations show the teaching of fractions in math along with music by use of the relative length of blocks.

Figure 19:
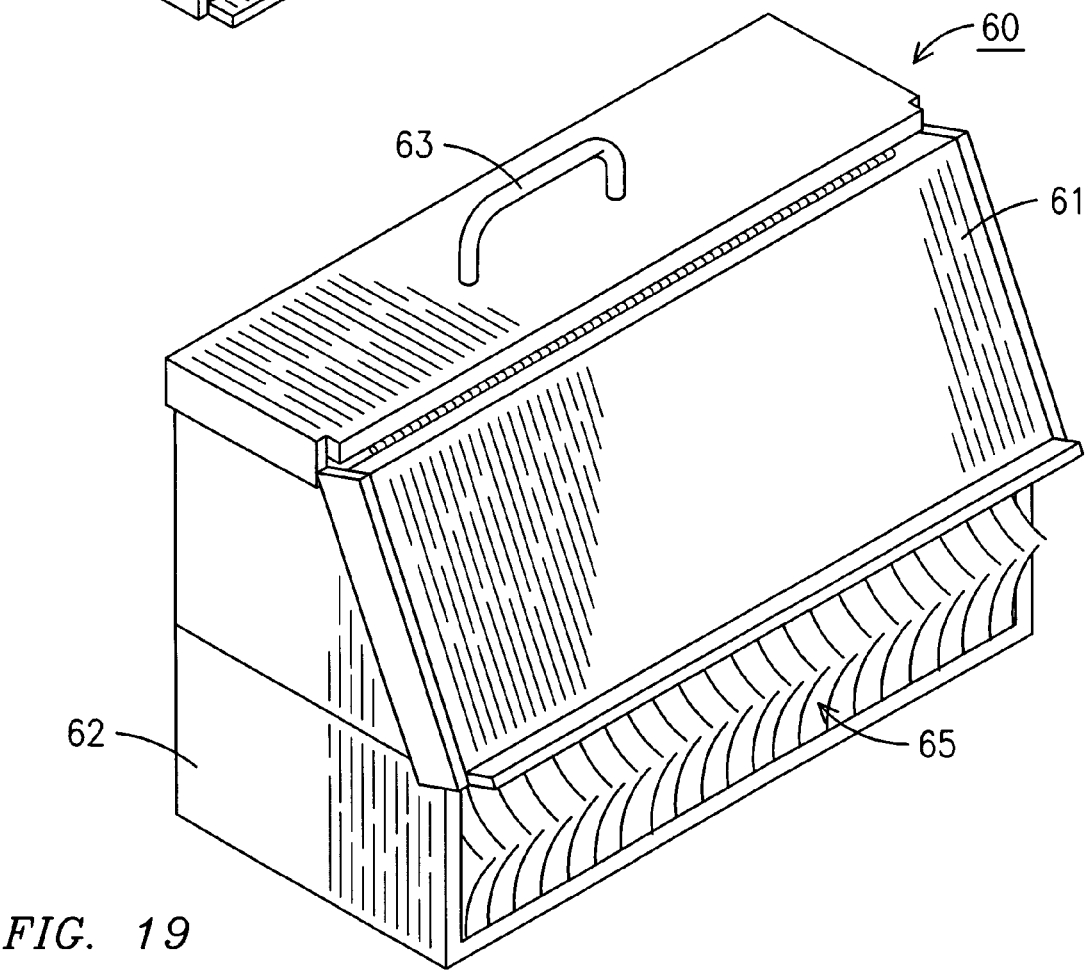
FIG. 19 is a front perspective view of second embodiment of the blind learning box of FIG. 18.
Figure 20:
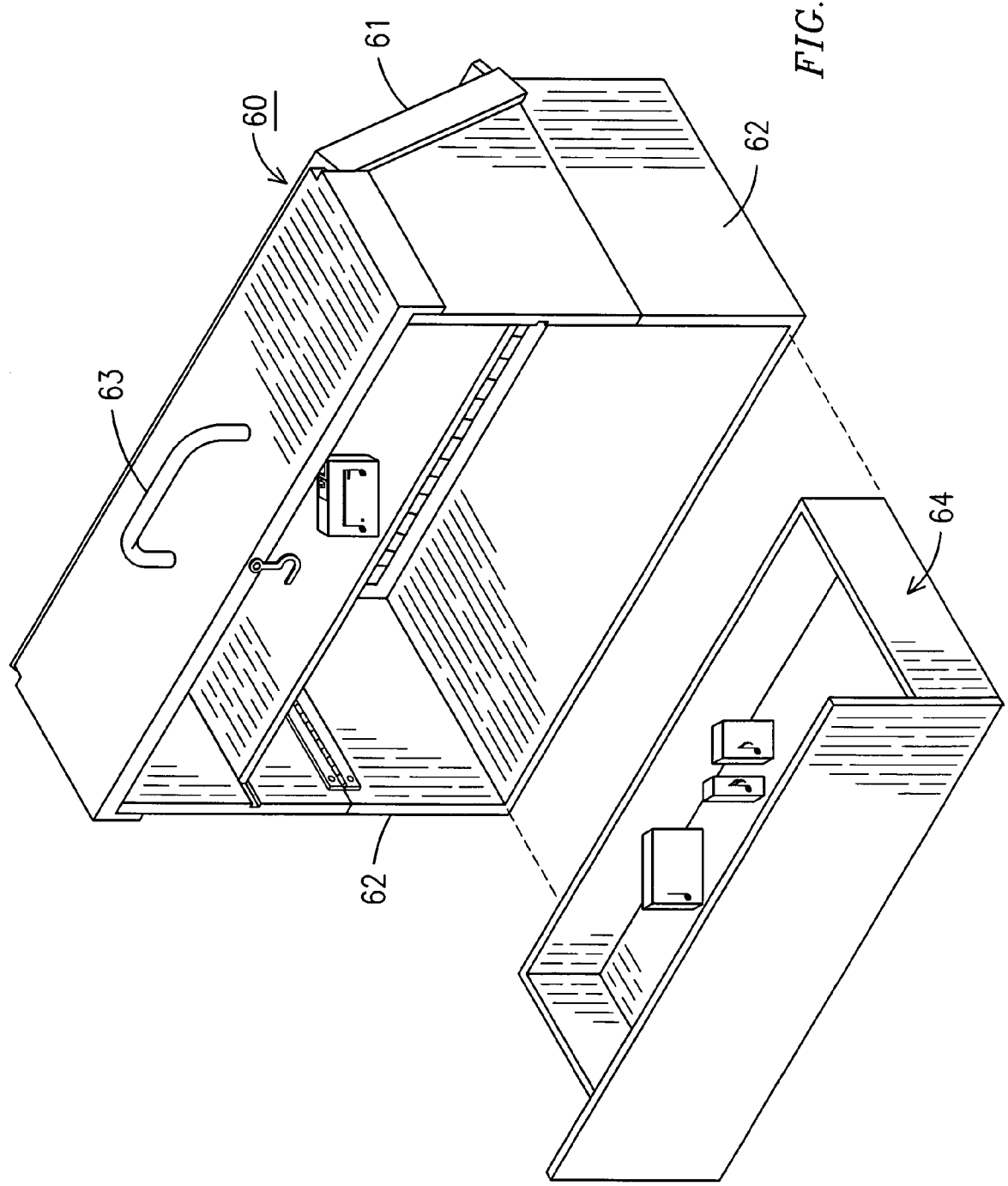
FIG. 20 is a rear exploded perspective view of the box of FIG. 19.
Figure 21:
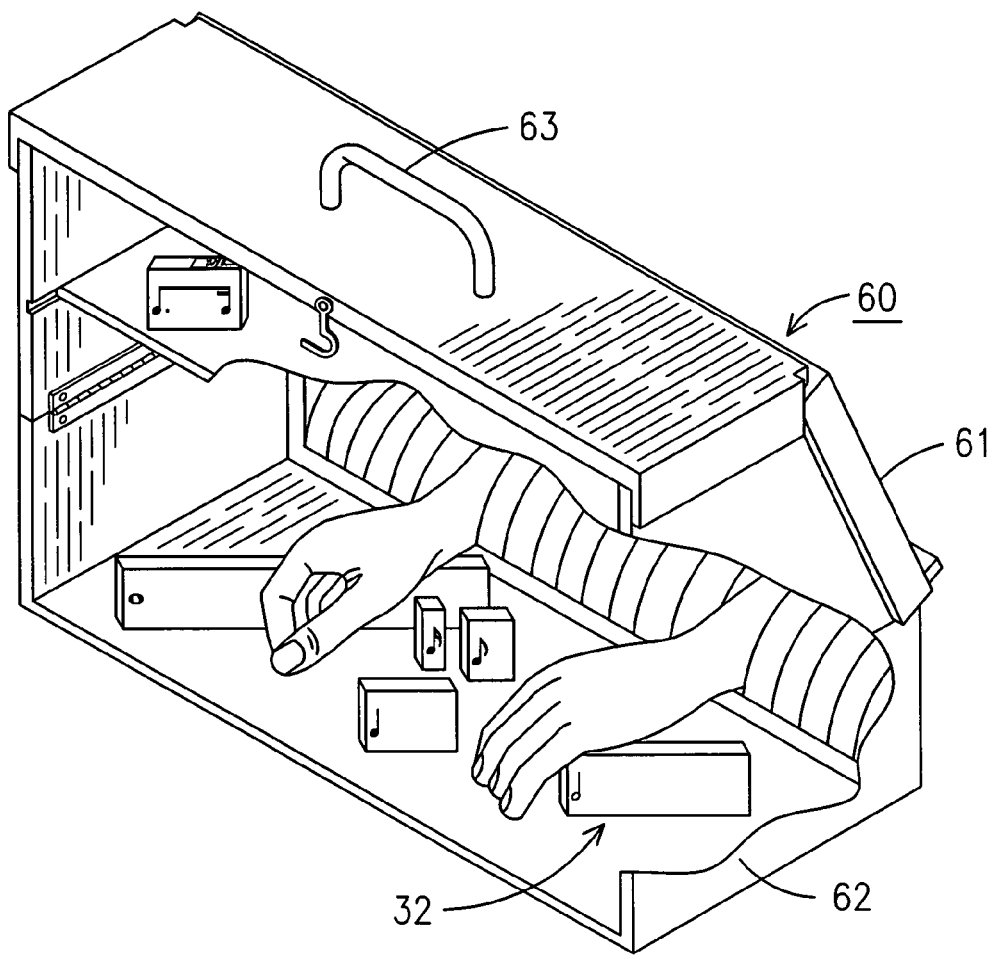
FIG. 21 is a cutaway perspective view of the box of FIGS. 19 and 20 being used by a student.
Figure 22:
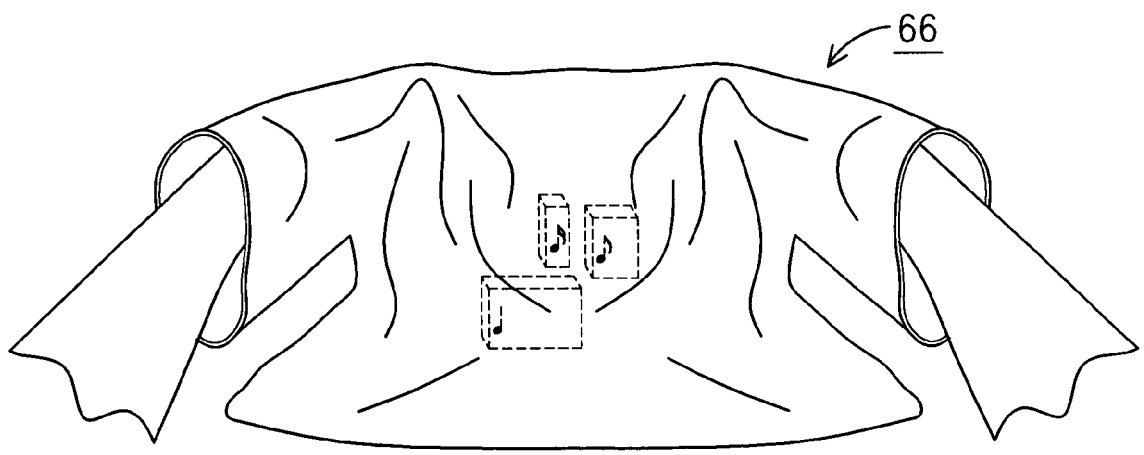
FIG. 22 is a perspective view of fabric blind being used by a student.

Teaching is further enhanced by the teaching blinds of FIGS. 18 through 22. In FIGS. 18-21, a storage box 60 can be used to create a blind for the student to work with the fraction, note, and beat blocks to allow students to identify the blocks by spatial methods in a total tactile environment. The box 60 has a hinged front 61 with hinged fold up side panels 62 for opening the box 60. The box 60 also has a handle 63 and a removable back drawer 64. When the box 60 is opened up as seen in FIGS. 19 and 20, a front opening 65 is formed to allow the student to put his hand therethrough. The box 60 has an open back that allows the teacher to place a number of blocks 32 and 46 for the student to group or determine values based on the length and thickness of the blocks. FIG. 22 works in a similar manner except for using a black flexible fabric to form the blind. The student puts his hands in the black blind and works with the blocks placed therein to determine values and to match fractions with note 32 and beat 46 blocks.

It should be clear at this time that a method of teaching fundamental fraction operations by utilizing musical note images, names and note blocks with spatial length equalities has been provided. Note and fraction blocks teach and introduce the fundamentals of mathematical fractions including fraction equalities, fraction addition & division, as well as improper-to-proper fraction reduction (i.e. 3/2=1½). Students gain understanding of the rules of fractions through the physical experiences of spatial, auditory, visual, and tactile. These fundamentals form the basis of advanced mathematical learning. The method also teaches beats as units of spatial length used to measure the physical length of a musical note and a measure of music. The beat block unit measurement system is calibrated to the shortest note length. The method of teaching time signatures is redefined as measure signature; such that the bottom number describes the beat unit length, and the top number describes the measure length. However the invention is not to be considered as limited to the forms shown which are to be considered illustrative rather than restrictive.

I claim:

1. A method of teaching music and fractions using varying length and thickness blocks comprising the steps of:

selecting a plurality of note blocks of one thickness and of varying length, each block length having a music note thereon with a whole note being of one length and a plurality of fraction notes each being of a fractional length of a whole note;

labeling each note block with the note symbol for the note block length and with the equivalent fraction;

selecting a box that blocks the view of a student of selected note and beat blocks hidden thereby, said box having an opening therein for insertion of the student's hands to allow the student to manipulate blocks;

selecting a plurality of beat blocks of varying length and of a thickness different from said note blocks, each beat block having a symbol for beat block position thereon;

positioning a selection of note and beat blocks in said selected box; and blindly arranging said plurality of note blocks and beat blocks in said box to form at least one measure of notes to form a block and beat note length of added fractions of notes and beats;

whereby musical notes and fractions are taught at the same time by the spatial relationships of blocks.

2. The method of teaching music and fractions using varying length and thickness blocks in accordance with claim 1 including the step of positioning said selected beat block adjacent a note block to indicate the note block's length of spatial measurement.

3. The method of teaching music and fractions using varying length and thickness blocks in accordance with claim 1 in which the step of selecting a box includes selecting a rigid box having an open side for the placement of note and beat blocks.

4. The method of teaching music and fractions using varying length and thickness blocks in accordance with claim 3 in which the step of selecting a box includes selecting a rigid box having storage space therein for storing said beat and note blocks.

5. The method of teaching music and fractions using varying length and thickness blocks in accordance with claim 4 in which the step of selecting a box includes selecting a rigid box having a handle thereon.

\* \* \* \* \*